Patented Dec. 5, 1933

1,938,078

UNITED STATES PATENT OFFICE 1,938,078

ARTIFICIAL DISPERSION OF RUBBER

Charles P. Mac Iver, Waterbury, Conn., assignor, by mesne assignments, to Dispersions Process, Inc., New York, N. Y., a corporation of Delaware No Drawing. Application June 14, 1930, Serial No. 461,262

7 Claims. (Cl. 87—17)

This invention relates to the manufacture of artificial rubber dispersions, and more particularly to the production of artificial dispersions wherein a substantially all-latex-solids-rubber such as spray dried rubber latex is dispersed in a non-solvent thereof.

An object of this invention is to provide an artificial dispersion of rubber in a non-solvent thereof having improved physical properties as compared with the ordinary aqueous dispersion of rubber such as pale crepe and smoked sheet. Other objects will be apparent from the following detailed description.

Accordingly the invention broadly comprises dispersing in a rubber non-solvent, rubber containing substantially all the solids natural to latex, and preferably a rubber such as rubber derived from a formaldehyde treated latex by evaporation of water therefrom. Various quantities of formaldehyde may be used, but it should not be used in quantities to cause thickening of the latex that is sufficient to interfere with proper spraying. The latex may be an acid stabilized latex such as shown by U. S. Patent 1,699,369 to John McGavack. The latex before drying may contain any protective or stabilizing agent or compounding ingredients such as accelerators, fillers, soaps, anti-oxidants, etc. The rubber may be broken down and compounded on any suitable apparatus such as a mill, and then dispersed in the non-solvent in a mixer of the Werner & Pfleiderer type or other suitable mixer in the same manner as is customary in processes of preparing artificial dispersions of pale crepe or smoked sheet. In such processes use is made of softening agents, soaps, tackifiers, fillers, anti-oxidants, accelerators, and other modifying agents. However, in dispersing dried latex rubbers such as formaldehyde-preserved-latex rubbers for adhesive purposes, the use of additional tackifiers may be substantially reduced or dispensed with owing to the retention of substantially all of the natural serum solids of the latex in the rubber. The increased ease with which rubber derived from formaldehyde treated latex is dispersed, as compared with pale crepe or smoked sheet, is believed to be due to the hardening or desolvation by the formaldehyde of the proteinous material surrounding the rubber particles in latex. It is believed for this reason that the rubber will coalesce more easily with a shorter mastication on the mill and kneading in the mixer thereby causing less injury to the physical properties of the rubber globule. This would allow less drastic action on the rubber polymer in a dispersing operation thereby substantially maintaining the original state of polymerization and chemical saturation, so that the individual rubber particles in the dispersion will not be substantially broken up and disintegrated and will be capable of combining with substantially the same amount of sulphur or other vulcanizing agents as in ordinary vulcanization practice.

The following illustration describes a preferred embodiment of the invention, but is not to be construed as limiting thereof. The parts stated are by weight:

100 parts of formaldehyde-preserved latex in spray dried form is broken down on a rubber mill in the presence of a softening agent such as about ½ part of a mineral hydrocarbon oil such as spindle oil. Milling is continued for about 45 minutes. If desired any of the usual compounding ingredients may be added to the rubber on the mill and mixed therewith. The rubber compound is then placed in a heated W & P steam jacketed mixer and thoroughly agitated for a short time. About 12 parts of rosin are then added continuing the mixing. In place of rosin any material adapted to form a soap may be used. Water is then added in small quantities while mixing so that the rubber will take up the water continuously without leaving an unabsorbed amount. The water may be added as a continuous stream or intermittently. When used intermittently it is preferred to use the water in separate portions of about 4½ parts of water. After about 9 parts of water have been added, about 1½ parts of dry caustic soda are added to the mix, agitating the same, while heated by the steam jacket of the mixer. The rosin is thereby saponified. In order to easily distribute the formed soap throughout the mass, cooling water is run into the jacket of the mixer after turning off the steam while continuing the mixing. After a short time water is gradually added in separate portions of about 4½ parts of water while continuing the mixing until about 75% solids is reached. At this point the rubber passes from the continuous to the disperse phase. Subsequent additions of water while agitating the mix allow of a dilution to any desired concentration. In place of the sodium resinate any of the customary dispersing agents may be used, such as soluble casein, glue, agar-agar, colloidal clays or the like. However, for adhesive purposes the alkali-metal soaps of the higher fatty acids are preferred because they interfere less with the tackiness of the final product when dried.

The dispersion prepared above when removed from the mixer is ready to be spread on fabrics of any kind for the manufacture of adhesive tapes, or when diluted to 20–40% solids is suited for shoe cements.

The following tests show the superior adhesive properties of an artificial dispersion of a substantially all-latex-solids rubber such as dried formaldehyde treated latex rubber over ordinary dispersions of plantation crude smoked sheet or pale crepe. The test is carried out by coating a fabric with each of the aqueous dispersions prepared from the formulas given below by doubling the fabric and then stripping it after it has aged about 24 hours:

The formulas are as follows:

| 1 | 2 | 3 |
| --- | --- | --- |
| 100 parts of formaldehyde-preserved all-latex-solids rubber. | 100 parts of pale crepe. | 100 parts of smoked sheet. |
| 1 part spindle oil. | 1 part spindle oil. | 1 part spindle oil. |
| 12 parts rosin. | 12 parts rosin. | 12 parts rosin. |
| 1.5 parts caustic soda. | 1.5 parts caustic soda. | 1.5 parts caustic soda. |

No. 1 gives a fraction pull of 4–5 lbs. per inch at a separation speed of 1 inch per minute; No. 2 gives a friction pull of 3–4 lbs. per inch at a separation speed of 1 inch per minute; No. 3 gives a friction pull of 2–3 lbs. per inch at a separation speed of 1 inch per minute. No. 1 also gives about 50% better ageing values than No. 2 or No. 3.

From the detailed description given above it will be obvious that changes may be made without departing from the principles of the invention, for instance where the latex originally contains sufficient added water soluble soap the amount of soap in the dispersing operation may be reduced or eliminated as is found suitable, and it is not desired to limit the invention otherwise than as set forth in the appended claims.

Having thus described my invention, what I claim and desire to protect by Letters Patent is:

1. A stable adhesive composition containing dried formaldehyde-treated rubber latex having the rubber thereof suspended in finely divided form in an aqueous menstrum and containing a water soluble soap.

2. An adhesive composition comprising dried formaldehyde-treated rubber latex having the rubber thereof dispersed in an aqueous medium, said composition containing a small proportion of water-soluble soap.

3. An adhesive composition comprising an all-solids dried formaldehyde-treated rubber latex having the rubber thereof dispersed in an aqueous medium, said composition containing a water-soluble soap.

4. An adhesive composition comprising spray dried formaldehyde-treated rubber latex having the rubber thereof dispersed in an aqueous medium, said composition containing a water-soluble soap.

5. An adhesive composition comprising an aqueous dispersion of dried formaldehyde-treated rubber latex, said dispersion having an alkali-metal soap dissolved therein, said rubber being a major proportion and said soap a minor proportion of the solid constituents of the adhesive composition.

6. An adhesive composition comprising an aqueous dispersion of an all-solids dried formaldehyde-treated rubber latex, said dispersion having an alkali-metal soap dissolved therein, said rubber being a major proportion and said soap a minor proportion of the solid constituents of the adhesive composition.

7. An adhesive composition comprising an aqueous dispersion of spray dried formaldehyde-treated rubber latex, said dispersion having an alkali-metal soap dissolved therein, said rubber being a major proportion and said soap a minor proportion of the solid constituents of the adhesive composition.

CHARLES P. MAC IVER.